Figure 6:
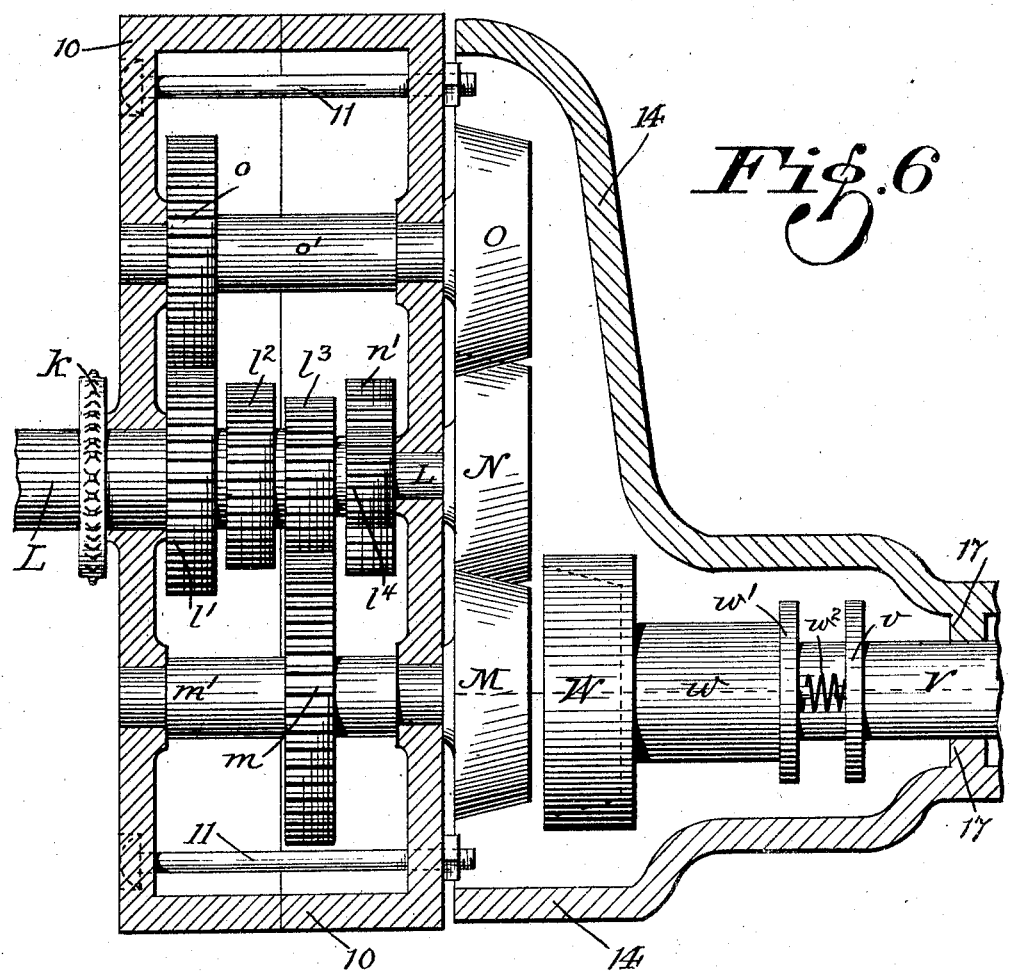

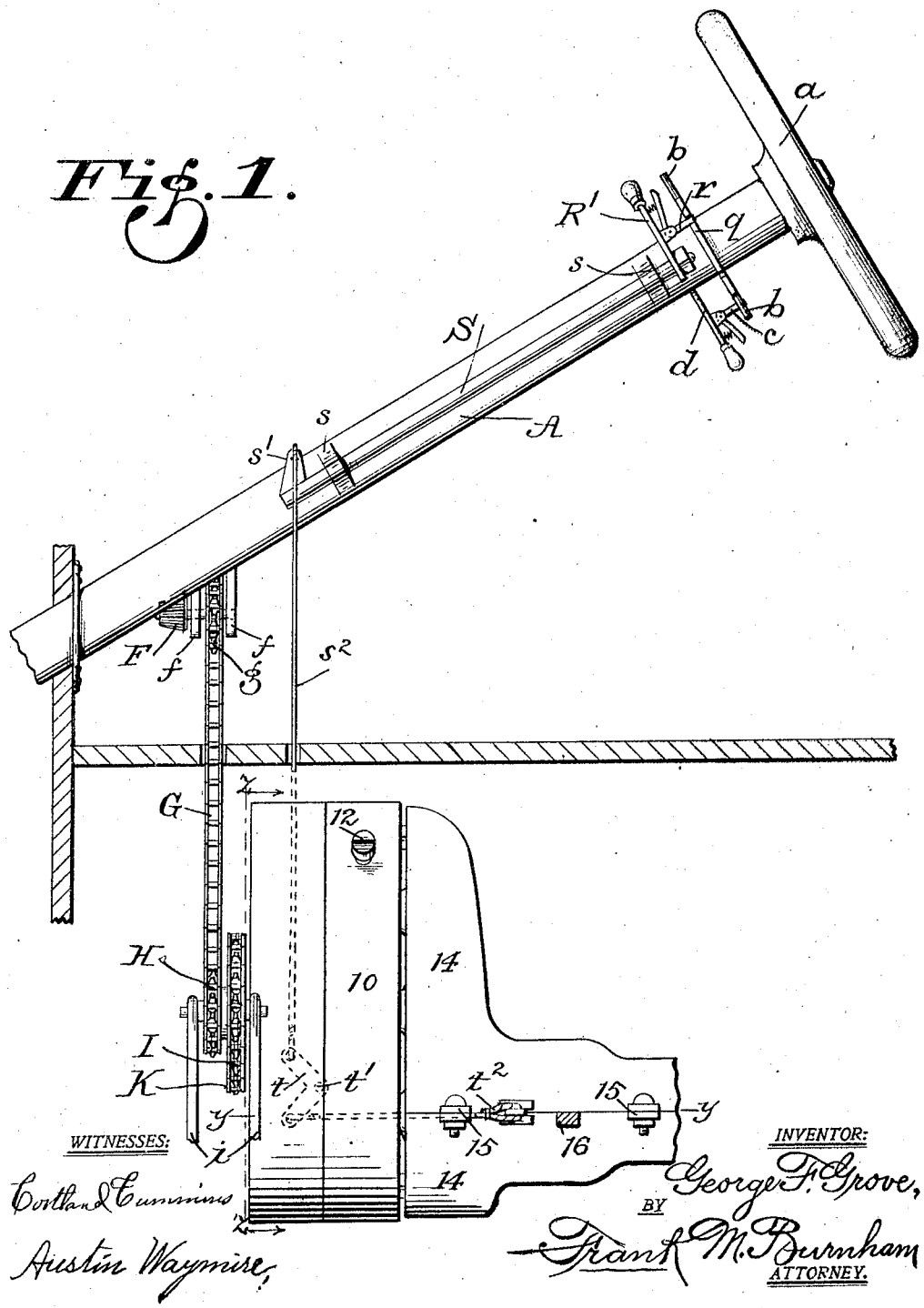

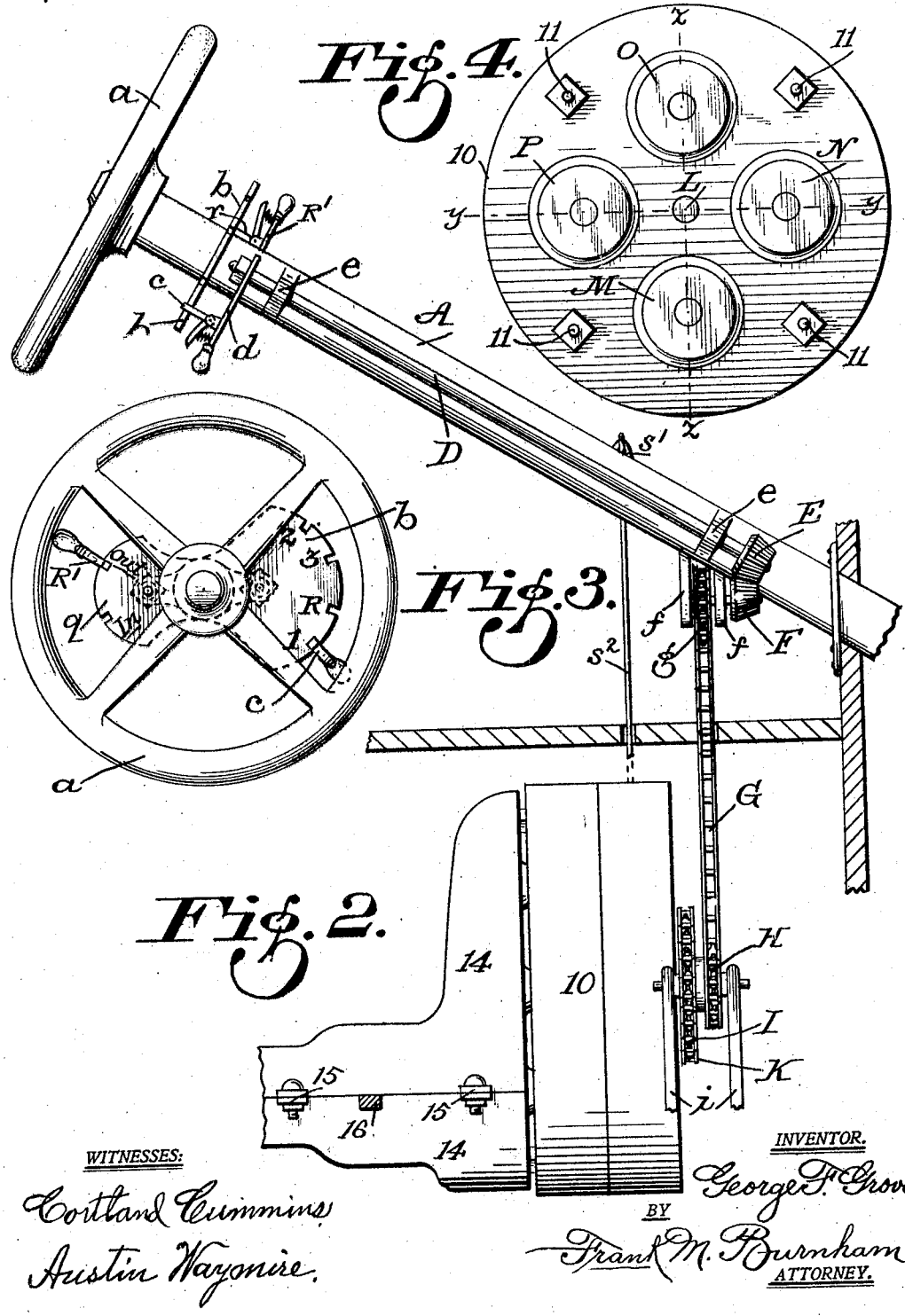

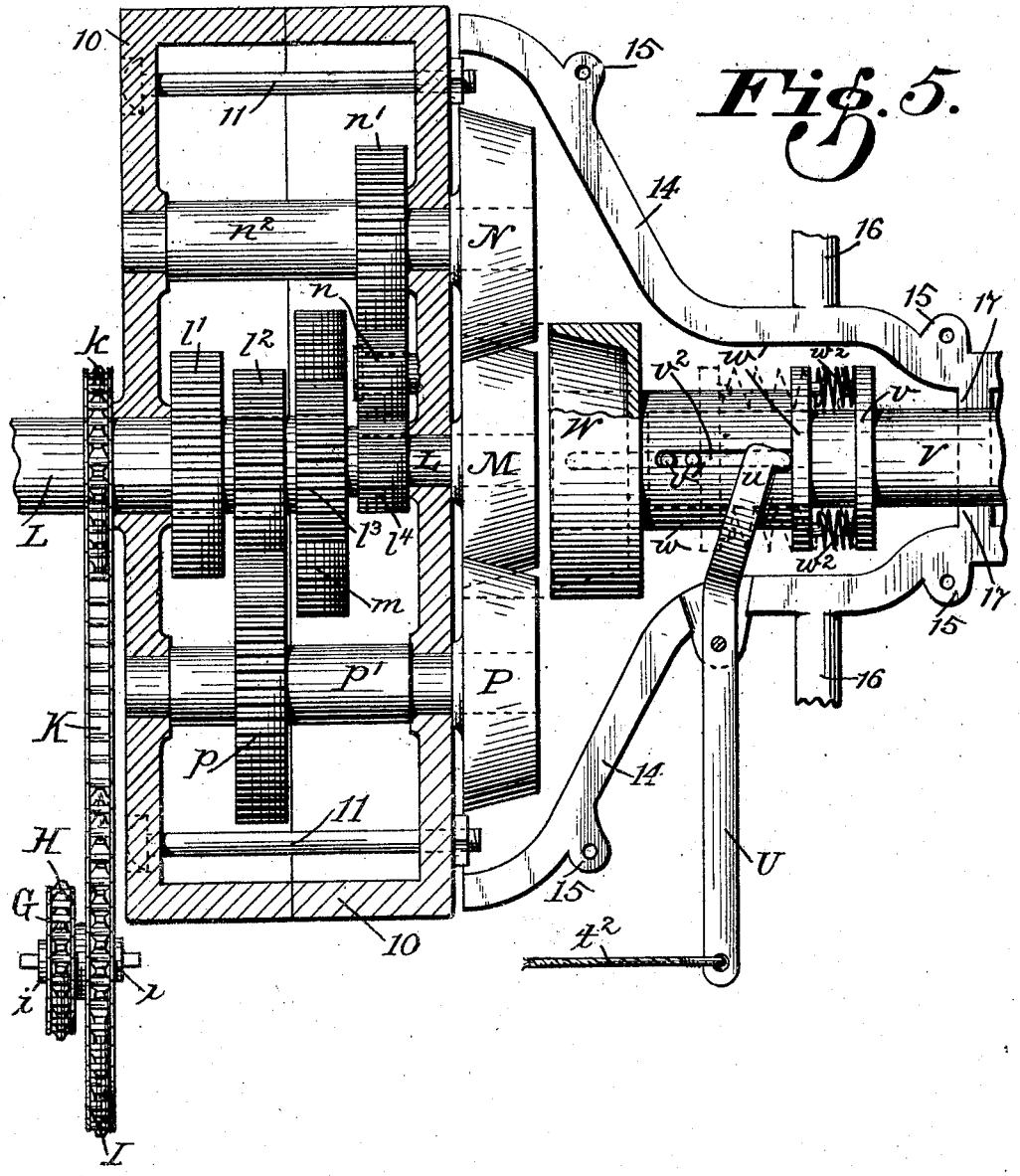

G. F. GROVE.
AUTOMOBILE TRANSMISSION GEARS.
APPLICATION FILED OCT. 9, 1913.

1,092,211.

Patented Apr. 7, 1914.
4 SHEETS—SHEET 4.

WITNESSES:
Cortland Cummins
Austin Waymire,

INVENTOR:
George F. Grove,
BY
Frank M. Burnham
ATTORNEY.

UNITED STATES PATENT OFFICE.

GEORGE F. GROVE, OF MADISON TOWNSHIP, MONTGOMERY COUNTY, OHIO.

AUTOMOBILE TRANSMISSION-GEARS.

1,092,211.  Specification of Letters Patent.  Patented Apr. 7, 1914.

Application filed October 9, 1913. Serial No. 794,342.

*To all whom it may concern:*

Be it known that I, GEORGE F. GROVE, a citizen of the United States, residing at Madison township, in the county of Montgomery and State of Ohio, have invented certain new and useful Improvements in Automobile Transmission-Gears, of which the following is a specification.

While my invention belongs to that class of devices employed for the transmission of motion and the regulation of speed generally; and known as transmission gears; it relates more directly and specifically to—"automobile transmission gears,"—or that class of transmission gears intended and designed for service on automobiles; in which connection it is herein shown and described.

Some of the principal objects of this invention, consist in providing transmission gears more especially intended, designed and adapted for automobiles; in which the construction is such that it avoids the objectionable features, now existing in this class of devices; such as the stripping of cogs or teeth; also the disengaging of gears. Also, in providing transmission gears in which there is only one clutch,—instead of the numerous clutches now employed. Also, in so constructing my transmission gears, that the drive-shaft will come on a horizontal plane or level—instead of on an incline as heretofore;—thereby minimizing the amount of friction generated at the universal joint of said drive-shaft. Also, in so constructing my device that there will never be but two gear wheels in active service at one time,—excepting in the case of reverse motion.— thus further reducing the amount of friction, thereby promoting the ease of operation. Also, in providing automobile transmission gears that can be operated from the post of the steering-wheel as well as elsewhere;—thereby affording more ease and convenience of operation.

Further objects are to provide a device as above referred to, that is simple in construction; is composed of few parts; is very efficient in its results; and one that can be manufactured at a comparatively small cost.

This invention consists essentially, referring briefly and in general terms to the structure covering my automobile transmission gears; of the very peculiar construction, arrangement and combination of the various mechanical parts and the minor details thereof; all of which will hereinafter be fully described in detail and set forth in the subjoined claims, all in accordance with the statutes in such cases made and provided therefor.

Referring to the accompanying drawings constituting a formal part of this specification, and illustrating one form of construction for carrying out the objects and principles of my invention, and wherein the same reference letters and numerals are utilized to indicate and point out the same parts wherever occurring throughout the several views:—Figure 1 is a side elevation of the device,—looking at the side from which the clutch is operated; and Fig. 2 is a side elevation of the opposite side,—or the side for changing the speed of the gears. Fig. 3 is a plan view of the steering-wheel and clutch operating and speed changing dials. Fig. 4 is an end view of the casing inclosing the gears,—showing the cones for operating same. Fig. 5 is a transverse sectional view through the inclosing casings showing the gears and clutch;—taken on line $y$—$y$ of Figs. 1 and 4; and Fig. 6, is a vertical sectional view similar to Fig. 5,—taken on line $z$—$z$ of Figs. 1 and 4.

In describing my said invention specifically, and referring in detail to the various mechanical parts or elements of construction, which combine to make up my automobile transmission gears, as shown throughout the several views of the drawings and indicated therein by means of the characters of reference as aforesaid,—and wherein for the sake of convenience in describing, the device is illustrated as set for slow speed forward with the clutch disengaged:— *a* refers to the steering wheel, mounted in the ordinary manner upon the steering-post—(not shown),—for operating same in the usual and well known manner. A, is the tubular casing inclosing said post, which is arranged and supported at the front of the car in the usual manner, and which is provided upon one side with the speed changing dial $b$; upon the top or forward face of which,—so as to be readily seen by the operator;—is marked the characters 1, R, 3 and 2;—(see Fig. 3);—which signify respectively—slow speed; reverse speed; fast speed and moderate speed. Speed changing dial $b$ which is semi-circular in form, has its periphery provided with four notches or recesses, one of which comes in line with one of each of said characters, and receives in its turn the end of the spring actuated pawl $c$ of hand lever $d$,—according to the speed desired, as indicated by the above referred to characters:—said pawl being operated by the fingers and thumb. Hand lever $d$ is attached to the end of a shaft D, by which said shaft can be rotated or turned the required distance according to the speed desired; by reason of its bearings $e$, which extends from the side of said tubular casing the proper distance. At the opposite end of shaft D is mounted a small pinion E, the teeth or cogs of which are in mesh with another pinion F, the axle of which is supported in bearings $f$, depending from tubular casing A. Located between bearings $f$, and carried by said axle of pinion F, is a sprocket-wheel $g$; around which moves sprocket-chain G which transmits motion down to another sprocket-wheel H—around which said sprocket-chain also passes. Sprocket-wheel H is formed on the same body or hub with another sprocket-wheel I, the axle of which is journaled and turns in the tops of the standards or supporting legs $i$—which in practice will be suitably supported upon any convenient cross-piece or body under the car,—and not necessary to be here shown. Around sprocket-wheel I passes another sprocket-chain K, which transmits the motion to another sprocket-wheel $k$, around which said chain passes.

Sprocket-wheel $k$ is intended to be bolted or otherwise connected or made rigid with the inclosing casing 10 of the gears; which is preferably formed in two sections connected by bolts 11 as shown; and is provided with an opening for oiling or lubricating the gears and shafts in the interior, said opening being closed by a screw 12 as shown in Fig. 1: and as sprocket-wheel $k$ turns it will carry with it inclosing casing 10, thereby causing same to turn or rotate upon engine or main shaft L upon which it hangs or floats; and with said casing will also turn or rotate the gears, shafts and cones.

Engine shaft L which extends or runs back from the engine and constantly revolves or turns when the engine is running, and is revolubly journaled in the inclosing casing; is adapted to carry gear or cog wheels $l^1$, $l^2$, $l^3$ and $l^4$; which are mounted upon it, and vary in size and are arranged accordingly, as fully shown in Figs. 5 and 6. In mesh with the gear wheel $l^3$ of said engine shaft, is a gear wheel $m$ carried by a shaft $m^1$ which is revolubly journaled in casing 10—see Figs. 5 and 6. Shaft $m^1$ is provided at its end with a cone M, which is arranged for slow speed forward when casing 10 is rotated by means of said sprockets and chains as above described, and spring pawl $c$ has engaged the notch in line with character "1" on dial $b$—as heretofore fully described,—thus indicating that said cone is now at its lowest point and in alinement with and ready to be engaged by the clutch; and when cone M is placed in engagement with said clutch, gear wheel $m$ of shaft $m^1$, and gear wheel $l^3$ of engine shaft L, will now do the pulling, while all other gear wheels will run idle. As clearly shown in Fig. 5, a small idle gear-wheel $n$ revolubly mounted on a short shaft projecting from casing 10, is in mesh with gear wheel $l^4$ of said engine shaft, while gear-wheel $n^1$ mounted on shaft $n^2$ revolubly journaled in casing 10 is in turn in mesh with idle gear-wheel $n$. Shaft $n^2$ is provided at its end with a cone N, which is arranged for the reverse speed, when casing 10 is rotated by means of said sprockets and chains—as above described,—and spring pawl $c$ has engaged the notch in line with character "R" on dial $b$—as heretofore fully described; thus indicating that said cone is now at its lowest point and in alinement with and ready to be engaged by the clutch: and when cone N is placed in engagement with said clutch, gear wheel $n^1$ of shaft $n^2$, idle gear-wheel $n$ and gear-wheel $l^4$ of the engine shaft will now do the pulling, while all other gear-wheels will run idle. In mesh with gear-wheel $l^1$ of said engine shaft, is a gear-wheel $o$, carried by shaft $o^1$; which is revolubly journaled in the casing 10—see Fig. 6. Shaft $o^1$ is provided at its end with a cone O, which is arranged for fast speed when said casing is rotated by means of said sprockets and chains—as above described,—and spring-pawl $c$ has engaged the notch in line with character "3" on dial $b$—as heretofore fully described,— thus indicating that said cone is now at its lowest point and in alinement with and ready to be engaged by the clutch:—and when said cone O is placed in engagement with said clutch, gear-wheel $o$ of shaft $o^1$ in mesh with gear-wheel $l^1$ of the engine shaft, will do the pulling; while all other gear-wheels will run idle. In mesh with gear-wheel $l^2$—of said engine shaft, is a gear-wheel $p$, carried by shaft $p^1$, which is revolubly journaled in casing 10. Shaft $p^1$ is provided at its end with a cone P, which is arranged for moderate speed when said casing is rotated by means of said sprockets and chains—as above described;—and pawl $c$ has engaged the notch in line with character "2" on dial $b$—as heretofore fully described;—thus indicating that said cone is now at its lowest point, and in alinement with and ready to be engaged by the clutch:—and when cone P is placed in engagement with said clutch, gear-wheel $p$ of shaft $p^1$ in mesh with gear-wheel $l^2$ of the engine shaft will now do the pulling, while all other gear-wheels will run idle.

Having now clearly described the speed changing mechanism, and manner of operation necessary to bring the cones in alinement with and ready to be engaged by the clutch; when "slow"; "reverse"; "fast" and "moderate" speed is desired, I will now proceed to describe the clutch operating mechanism and manner of operation necessary to cause said clutch to engage said cones when the respective speeds are desired.

Tubular casing A is provided on its opposite side from speed changing dial $b$ with the clutch operating dial $q$, which has marked upon its top or forward face—so as to be readily seen by the operator,—the words "Out" and "In" (see Fig. 3); which signifies respectively that said clutch is out of engagement or disengaged from the lowest cone in alinement with it, or that said clutch is in engagement or has engaged the lowest and respective cone as indicated by the character on dial $b$ as heretofore fully described. Clutch operating dial $q$ which is semi-circular in form has its periphery provided with two notches or recesses, one of which comes in line with each of the words "Out" and "In", and receives in its turn the end of the spring actuated pawl $r$ of hand lever $R^1$, according to whether it is desired for said clutch to engage or disengage a respective cone for a respective speed, as indicated by dial $b$. Hand lever $R^1$ is connected to the end of a shaft S, by which said shaft can be rotated or turned—according to the respective notch in line with the word "Out" or "In", which it is desired pawl $r$ to engage,—by reason of the bearings $s$ of said shaft extending from the side of tubular casing A the proper distance. The opposite end of shaft S is provided with a lip or extension $s^1$, to which is hooked the end of a rod $s^2$, the opposite end of which is in turn hooked to a bell crank lever $t$—see dotted lines Fig. 1,—which is fulcrumed at $t^1$ to any convenient projection, member or other support under the car. Connected to the other arm of said bell crank lever is a rope $t^2$, the opposite end of which is attached to a lever U which is formed with a bifurcated end $u$—as clearly shown in Fig. 5;—and which is fulcrumed between lugs $u^1$ projecting from the two sections 14, forming the casing which incloses the cones, and clutch and drive shaft mechanism;—there being an opening left between said lugs suitable for said lever to extend through and move or play therein. The two sections 14 forming said casing, are provided with lugs 15, which receive small bolts by which said sections are connected together as shown: the lower section is provided on the sides— as more particularly shown in Fig. 5,—with an arm or brace 16 of any ordinary but suitable form of construction, which is here shown as broken off but in practice is intended to extend its full length and to terminate in a foot, by which it may be attached to the car so as to support said casing, thus bracing and holding same in position. Sections 14 forming said casing are each further provided or formed with a semi-circular collar 17 which constitutes a bearing or hub,—see Figs. 5 and 6,—for the drive-shaft V, here shown as broken off; but which of course extends back to the rear axle of the car, and is there provided with the differential gears in the usual manner. Drive-shaft V is provided with a collar $v$, and also two retaining stops $v^1$ which rests in a slot $v^2$ formed in the sleeve $w$ of clutch W; which rests and works on end of said drive-shaft, (see Fig. 5); said sleeve is also formed with a collar $w^1$ between which and collar $v$ of the drive-shaft are suitably retained two springs $w^2$; there being one of said springs arranged on each side of said drive-shaft; which are here shown as compressed, by reason of the bifurcated end $u$ bearing and pressing against collar $w^1$ of sleeve $w$, when clutch W is in a disengaged position as shown; by reason of the clutch mechanism having been operated until spring pawl $r$, has dropped into engagement with the notch in dial $q$ in line with the word "Out",—as heretofore clearly and fully described. Now by simply reversing this operation, by moving hand lever $R^1$ downward or in an opposite direction from that described, shaft S will also move or turn in an opposite and downward direction, allowing rod $s^2$ to drop, when the tension of rope $t^2$ will be relaxed, thus allowing lever U to move in an opposite or forward direction, when springs $w^2$ will now react and expand throwing sleeve $w$ forward when its clutch W will grasp or fit over and be brought into engagement with the lower cone in alinement with it as heretofore described: and if cone M the car will move at slow speed; if cone N reverse speed will be obtained; if cone O fast speed; or if cone P the car will be propelled at moderate speed: by reason of the gear-wheel on the shaft of the respective cone pulling with the opposite gear-wheel on the engine shaft that it is is mesh with, also by reason of the drive shaft being now set in motion and the car will be accordingly propelled by means of the differential gears of the usual construction.

It of course will be understood that while the engine is running, the engine-shaft as well as all shafts, gears and cones will be revolving; and when the clutch is disengaged they will be running idle.

Having now described my automobile transmission gears,—in connection with the illustrations;—as my invention and as new: I claim—

1. The combination in a device for the transmission of motion; of the main shaft and its gearing; the inclosing casing mounted on said main shaft; other shafts each having a gear wheel and a cone and journaled in said casing, an idle gear-wheel within said casing; a dial extending from the casing of the steering post for indicating when a respective cone is in position for a desired speed; speed changing mechanism connected with the casing of the steering post for rotating a respective cone in position for a desired speed; another inclosing casing suitably supported; a drive shaft carrying a clutch inclosed by said last mentioned casing; a dial extending from the casing of the steering post for indicating when said clutch has engaged or disengaged a respective cone; and mechanism connected with the casing of the steering wheel for operating said clutch so as to throw same in or out of engagement with a respective cone; all substantially as and for the purposes described.

2. In a means for transmitting motion to automobiles; an engine shaft having mounted thereon gear wheels; a casing floating upon said engine shaft for inclosing the gear wheels of same; several shafts each carrying a gear-wheel and a cone, and journaled in said casing; an idle gear-wheel revolubly supported within said casing; an indicating dial and suitable mechanism connected to the tubular casing of the steering post for throwing the respective cone in alinement with the clutch so as to obtain the speed desired; a second casing inclosing the cones; a drive shaft revolubly supported within said casing and arranged on a level plane below the engine shaft and provided with a spring actuated clutch; a clutch indicating dial and mechanism extending from the tubular casing, and bifurcated lever for operating said clutch; all substantially as described.

3. In a device for the transmission of motion; a main shaft upon which is mounted several gear-wheels; an inclosing casing provided with a sprocket-wheel, and adapted to float upon said main shaft; shafts journaled in said casing each carrying a gear-wheel and a cone, said shafts arranged in a circle around said engine shaft; an idle gear wheel supported within said casing; a second inclosing casing adapted for revolubly supporting therein a drive shaft carrying a spring actuated clutch; a dial extending from the tubular casing of the steering post, and having characters thereon indicative of the speed and when the respective cone is in alinement with said clutch; a shaft, pinions, sprocket wheels and chains for changing the speed; and a dial extending from the tubular casing of the steering post having characters thereon to indicate whether said clutch is in or out of engagement with a respective cone; a shaft, bell-crank lever, bifurcated lever and connections for operating said clutch; all substantially as described.

4. Transmission gears for automobiles, comprising;—an engine shaft provided with gear wheels of varying sizes; an inclosing casing for said gear wheels and provided with a sprocket-wheel and adapted to float upon said engine shaft; several shafts journaled in said casing each provided with a gear wheel in mesh with a respective one of the gear wheels on said engine shaft, and each carrying a cone; an idle wheel within said casing in mesh with one of the gear wheels of said engine shaft; another shaft also journaled within said casing and having a gear wheel in mesh with said idle gear wheel and provided with a cone; another casing suitably supported; a drive shaft supported within said last mentioned casing, carrying a spring actuated sleeve and clutch; speed changing dial and mechanism connected to the tubular casing of the steering post, for revolving the gear inclosing casing so as to bring a respective cone at its lowest point and in alinement with said clutch; and a clutch operating dial and mechanism for throwing said clutch in or out of engagement with said lowermost cone; all substantially as described.

5. The combination in automobile transmission gears; of the engine shaft carrying gear wheels varying in size; an inclosing casing upon said engine shaft; several shafts journaled in said casing and each carrying a gear wheel in mesh with one of the gear wheels of said engine shaft and provided with a cone; an idle gear wheel mounted on a short shaft within said casing and in mesh with one of the gears on the engine shaft, also in mesh with one of the gear wheels of one of the other shafts; a dial extending from the tubular casing of the steering post for indicating the desired speed, and mechanism connected to the tubular casing of the steering post for rotating the inclosing casing and the gears so as to bring the desired cone in position to give the speed indicated on said dial; a drive shaft on a level plane below said engine shaft and carrying a spring actuated sleeve and clutch, said clutch adapted to engage or disengage the respective cone for the speed desired; and a dial extending from the tubular casing of the steering post for indicating when said clutch has engaged or disengaged the cone, and clutch operating mechanism extending from the tubular casing inclosing the steering post; all substantially as described.

In testimony whereof I affix my signature in presence of two witnesses.

GEORGE F. GROVE.

Witnesses:
   CHAS. A. ARNETT,
   W. S. RHOTEHAME.